United States Patent [19]
Campbell et al.

[11] Patent Number: 5,555,173
[45] Date of Patent: Sep. 10, 1996

[54] DAMPING FACTOR SWITCHING IN VEHICLE SHOCK ABSORBERS

[75] Inventors: Douglas C. Campbell, Dearborn; Gary J. Gloceri, West Bloomfield; Daniel M. McCoy, Shelby Township, all of Mich.

[73] Assignee: Ford Motor Company, Dearborn, Mich.

[21] Appl. No.: 356,988

[22] Filed: Dec. 16, 1994

[51] Int. Cl.⁶ .................................................. B60G 17/015
[52] U.S. Cl. ..................................... 364/424.05; 280/707
[58] Field of Search ........................ 364/424.05; 280/707, 280/840

[56] References Cited

U.S. PATENT DOCUMENTS

| | | | |
|---|---|---|---|
| Re. 34,628 | 6/1994 | Fujishiro et al. | 280/707 |
| 4,517,832 | 5/1985 | Holland et al. | 73/118 |
| 4,616,848 | 10/1986 | Sugasawa et al. | 280/707 |
| 4,671,533 | 6/1987 | Asami et al. | 280/707 |
| 4,714,271 | 12/1987 | Buma et al. | 280/707 |
| 4,728,120 | 3/1988 | Buma et al. | 280/707 |
| 4,729,580 | 3/1988 | Buma et al. | 280/707 |
| 4,749,210 | 6/1988 | Sugasawa | 280/707 |
| 4,756,549 | 7/1988 | Kurosawa et al. | 280/707 |
| 4,770,438 | 9/1988 | Sugasawa et al. | 280/707 |
| 4,804,203 | 2/1989 | Glab et al. | 280/707 |
| 4,822,063 | 4/1989 | Yopp et al. | 280/840 |
| 4,856,815 | 8/1989 | Tanaka et al. | 280/707 |
| 4,934,732 | 6/1990 | Fukunaga et al. | 280/707 |
| 4,936,425 | 6/1990 | Boone et al. | 188/299 |
| 4,967,359 | 10/1990 | Sugasawa et al. | 364/424.05 |
| 5,075,855 | 12/1991 | Sugasawa et al. | 364/424.05 |
| 5,083,275 | 1/1992 | Kawagoe et al. | 364/424.05 |
| 5,083,454 | 1/1992 | Yopp | 73/118.1 |
| 5,090,728 | 2/1992 | Yokoya et al. | 280/707 |
| 5,133,574 | 7/1992 | Yamaoka et al. | 280/707 |
| 5,175,687 | 12/1992 | Tsutsumi et al. | 364/424.05 |
| 5,377,107 | 12/1994 | Shimizu et al. | 364/424.05 |
| 5,444,621 | 8/1995 | Matsunaga et al. | 364/424.05 |

*Primary Examiner*—Michael Zanelli
*Attorney, Agent, or Firm*—Roger L. May; Gregory P. Brown

[57] ABSTRACT

One or more vehicle suspension signals, preferably already generated within a controllable suspension system, is utilized to perform switches of the damping state of variable damping shock absorbers in the suspension system while the velocity of the shock absorbers is close to zero velocity. In particular, signals generated by height sensors within a controllable suspension system are utilized as vehicle suspension signals which are filtered to generate signals to enable switching of the shock absorbers while the shock absorbers are close to zero velocity. In addition, performance of the suspension system is improved by utilizing the vehicle suspension signals as one criterion to determine when switching from soft damping to firm damping or from firm damping to soft damping is desirable. Switch enable signals are determined from vehicle suspension signals by filtering at a resonant body frequency and comparison to an appropriate threshold. Soft-to-firm/firm-to-soft switch request signals are determined from vehicle suspension signals by filtering at a resonant wheel frequency and comparison to appropriate thresholds. Preferably, firm-to-soft switches are made after expiration of predefined time periods.

7 Claims, 3 Drawing Sheets

DAMPING FACTOR SWITCHING IN VEHICLE SHOCK ABSORBERS

BACKGROUND OF THE INVENTION

The present invention relates in general to motor vehicle suspension systems which include variable damping shock absorbers and preferably controllable springs, for example air springs, and, more particularly, to a method for controlling the shock absorbers in response to suspension frequency signals.

Motor vehicle suspension systems are connected between the body of the vehicle and the wheels to determine the ride and handling of the vehicle. Conventional suspension systems include springs and shock absorbers which are fixed such that the ride and handling are fixed as well.

More advanced suspension systems include controllable elements such as variable damping shock absorbers which permit two or more damping factors to be selected as needed. Controllable springs may also be included. Such springs are typically pneumatically or air controlled and are inflated to increase the spring rate of the overall vehicle spring system and deflated to decrease the spring rate.

In prior art suspension systems, the shocks and springs may be manually controlled by the operator of the vehicle. Automatic control is also utilized to control the shocks and springs in response to inputs from the vehicle as well. For example, the damping factor of the shock absorbers may be switched to a firmer damping in response to operating characteristics of the shock absorbers exceeding defined levels.

It is known to monitor shock absorber activity by means of accelerometers associated with the shock absorbers. The switching of the damping factor of the shock absorbers and the time of switching are then based on output signals from the accelerometers.

Such damping factor switching operations can be performed to substantially prevent body movements which can otherwise be caused by the switching. Prevention of the body movements is important to prevent operator concern regarding the ride and handling performance of the vehicle. Unfortunately, the inclusion of accelerometers in the suspension system results in complexity and expense.

Accordingly, there is a need for an improved suspension control system which can be simply and inexpensively implemented without accelerometers to control switching of the damping factor of variable damping shock absorbers such that the switches are substantially imperceptible to the operator of a motor vehicle.

SUMMARY OF THE INVENTION

This need is met by the invention of the present application wherein one or more vehicle suspension signals, preferably already generated within a controllable suspension system, is utilized to perform switches of the damping state of variable damping shock absorbers in the suspension system while the velocity of the shock absorbers is close to zero velocity.

In particular, signals generated by height sensors within a controllable suspension system can be utilized as vehicle suspension signals which are filtered to generate signals to enable switching of the shock absorbers while the shock absorbers are close to zero velocity. In addition, performance of the suspension system can be improved by utilizing the vehicle suspension signals as one criterion to determine when switching from a soft suspension damping factor toward a more firm suspension damping factor or from a firm suspension damping factor toward a more soft suspension damping factor is desirable.

Switch request signals are determined from vehicle suspension signals by filtering at a resonant body frequency and comparison to appropriate thresholds; and, soft-to-firm/firm-to-soft switch enable signals are determined from vehicle suspension signals by filtering at a resonant wheel frequency and comparison to appropriate thresholds. While firm-to-soft switches can be made based on thresholds as noted, it is currently preferred to make such switches after expiration of predefined time periods.

In accordance with one aspect of the present invention, a method for operating a controllable vehicle suspension connected between a body and wheels of a vehicle comprises the steps of: generating a vehicle suspension signal representative of the relative positioning of said body and at least one of said wheels; filtering said vehicle suspension signal to determine a wheel frequency signal representative of the velocity of the vehicle suspension at a wheel frequency; and, generating a switch enable signal while said wheel frequency signal is near zero velocity of the vehicle suspension to enable switching damping of said vehicle suspension.

In accordance with another aspect of the present invention, a method for operating a controllable vehicle suspension connected between a body and wheels of a vehicle comprises the steps of: determining a body frequency signal representative of the velocity of the vehicle suspension at a body frequency; comparing said body frequency signal to a threshold signal; generating a switch request signal to request a change in damping in said vehicle suspension in response to comparing said body frequency signal to said threshold signal; determining a wheel frequency signal representative of the velocity of the vehicle suspension at a wheel frequency; generating a switch enable signal while said wheel frequency signal is near zero velocity of the vehicle suspension; and, combining said switch request signal and said switch enable signal to generate a switch signal for switching damping of said vehicle suspension.

It is a feature of the present invention to provide an improved suspension control system for a vehicle wherein shock absorber damping factor changes are performed such that the changes are substantially imperceptible to the operator and passengers of the vehicle in response to vehicle suspension signals; and, to provide an improved suspension control system for a vehicle wherein existing suspension signals are used to control damping factor switching of shock absorbers of the suspension system.

Other features and advantages of the invention will be apparent from the following description, the accompanying drawings and the appended claims.

DETAILED DESCRIPTION OF THE INVENTION

Figure 1:
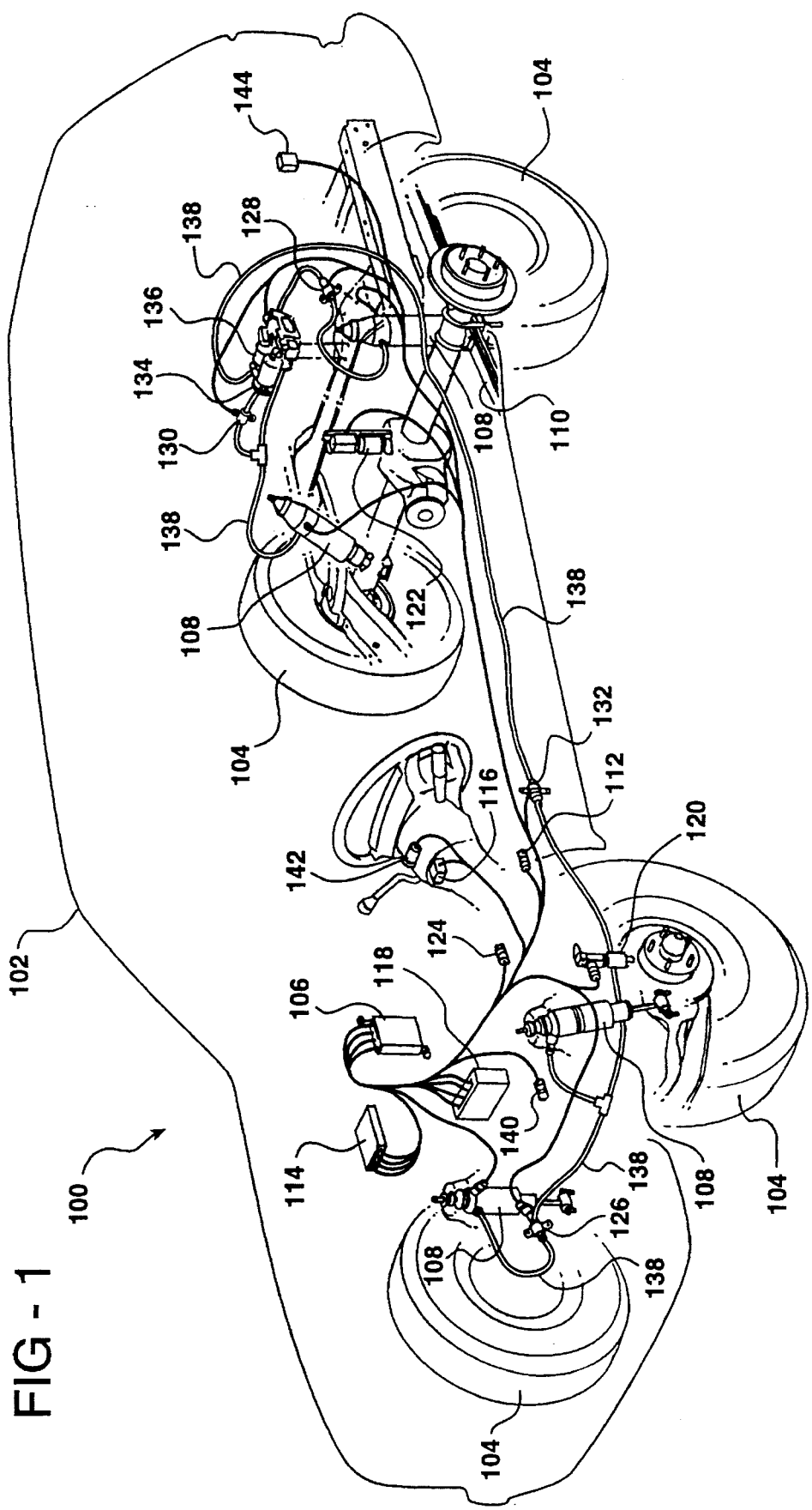
FIG. 1 is a perspective view of a vehicle, with the body shown in outline, including a controllable suspension system operable in accordance with the present invention.

The invention of the present application will be described with reference to a vehicle 100 and, more particularly, to a controllable suspension connected between a body 102 and wheels 104 of the vehicle 100 as illustrated in FIG. 1. The vehicle 100 includes an automatic ride control system having a computer controller 106 which controls the various components of the suspension. The four corners of the vehicle are controlled, in part, by two stage, firm and soft, shock absorbers 108 to provide a smooth ride for normal driving without sacrificing handling performance. An air spring integral with each shock absorber 108 permits load leveling and vehicle height adjustment over a span of approximately 50 mm (2 inches). Of course, air springs and shock absorbers which are separate from one another could be used for the suspension.

A smooth ride is achieved through selection of lower rate front torsion bars, not shown, and rear leaf springs 110, front and rear anti-roll bars, not shown, and selection of soft damping for the shock absorbers 108. Handling performance is maintained by reading driver and road inputs that, under certain conditions, switch the damping rate of the shock absorbers 108 to firm, minimizing body movement. Driver inputs may include: braking, monitored via a brake switch 112; throttle position, monitored via a primary engine control computer 114; steering rate and position, monitored via a steering sensor 116; and, since the illustrated vehicle 100 includes a selectable four wheel drive capability, transfer case setting, monitored via an electronic module 118. Road inputs are sensed by a vehicle speed indicator 124 located near an output shaft of a transmission, not shown, of the vehicle 100 and two suspension mounted height sensors, a front height sensor 120 and a rear height sensor 122.

The automatic ride control system controls the height of the vehicle 100 on the front and rear axles separately through the use of an air compressor 136, air lines 138, and five solenoid valves: a front gate solenoid valve 126; a rear gate solenoid valve 128; a rear fill solenoid valve 130; a front fill solenoid valve 132; and, a vent solenoid valve 134. The vent solenoid valve 134 is located in a cylinder head of the air compressor 136. The compressor 136 is controlled via a compressor relay 140.

Enclosed in each of the shock absorbers 108 is an air spring and a mechanism that enables switching between soft and firm damping. The air spring integrated into each of the shock absorbers 108 is capable of independently raising and lowering each corner of the vehicle 100 based on the pressure and volume of air supplied to it. The automatic ride control system regulates the pressure in each air spring by compressing and venting the air provided to it. As earlier noted, the air springs and shock absorbers 108 could be separate from one another. Further, since a variety of mechanisms are known for switching the damping rates of shock absorbers for motor vehicles, the shock absorbers will not be described in detail herein.

The air compressor 136 is connected to the shock absorbers 108 via the solenoid valves 126–132 and the air lines 138. The front shock absorbers 108 are controlled via the front fill solenoid valve 132 and the front gate solenoid valve 126. When the front fill solenoid valve 132 and the front gate solenoid valve 126 are energized, air pressure to the front shock absorbers 108 can be modified. The rear shock absorbers 108 are controlled via the rear fill solenoid valve 130 and the rear gate solenoid valve 128. When the rear fill solenoid valve 130 and the rear gate solenoid valve 128 are energized, air pressure to the rear shock absorbers 108 can be modified. The front and rear gate solenoid valves 126, 128 can be activated to isolate the left side of the vehicle from the right side of the vehicle.

The automatic ride control system is also under the control of a vehicle ignition switch 142 and a suspension control switch 144 which must be turned to the off position when the vehicle 100 is to be hoisted, jacked, towed, jump-started or raised off the ground.

In existing suspension systems including controllable shocks and springs, adjustments may be manually controlled by the operator of the vehicle. Automatic control is also utilized to control the shocks and springs in response to inputs from the vehicle as well. For example, the damping factor of the shock absorbers may be switched in response to operating characteristics of the shock absorbers exceeding defined levels.

For example, shock absorber activity has been monitored by means of accelerometers associated with the shock absorbers. The switching of the damping factor of the shock absorbers and the time of switching are then based on output signals from the accelerometers.

Such damping factor switching operations can be performed to substantially prevent body movements which can otherwise be caused by the switching. Prevention of the body movements is important to prevent operator concern regarding the ride and handling performance of the vehicle. Unfortunately, the inclusion of accelerometers in the suspension system results in complexity and expense.

In the present invention, this problem is overcome by utilizing a vehicle suspension signal (VSS), preferably already generated within the controllable suspension, to perform damping factor switches in the shock absorbers 108 and to perform those switches while shock absorber velocity is close to zero. Advantageously, in the present invention the vehicle suspension signal (VSS) is generated by the controllable suspension of the vehicle 100 for vehicle height control. In particular, the controllable suspension of the vehicle 100 utilizes one or both of the height signals generated by the front height sensor 120 and the rear height sensor 122.

Thus, in accordance with the present invention, in addition to using the height signals for determining and adjusting the height of the vehicle 100, the height signal from the front height sensor 120 is also used as a front vehicle suspension signal and the height signal from the rear height sensor 122 is also used as a rear vehicle suspension signal for control of the two stage shock absorbers 108. While these vehicle suspension signals could be generated by other means as should be apparent, the dual use of the height signals reduces mechanical complexity and expense in implementing the present invention.

In any event and however generated, in accordance with the present invention, the vehicle suspension signals are used for determining when shock absorber velocity is close to zero for enabling switching the damping factors of the shock absorbers 108. In addition, the vehicle suspension signals from the front height sensor 120 and the rear height sensor 122 are used to generate switch request signals for switching the shock absorbers 108 from soft to firm. This is but one of a number of criteria which can request switching of the shock absorbers 108 between soft and firm damping. Switching of the shock absorbers from firm to soft can also be performed in response to the vehicle suspension signals; however, it is currently preferred to perform the switch or switch back from firm to soft after the expiration of a defined time period.

Figure 2:
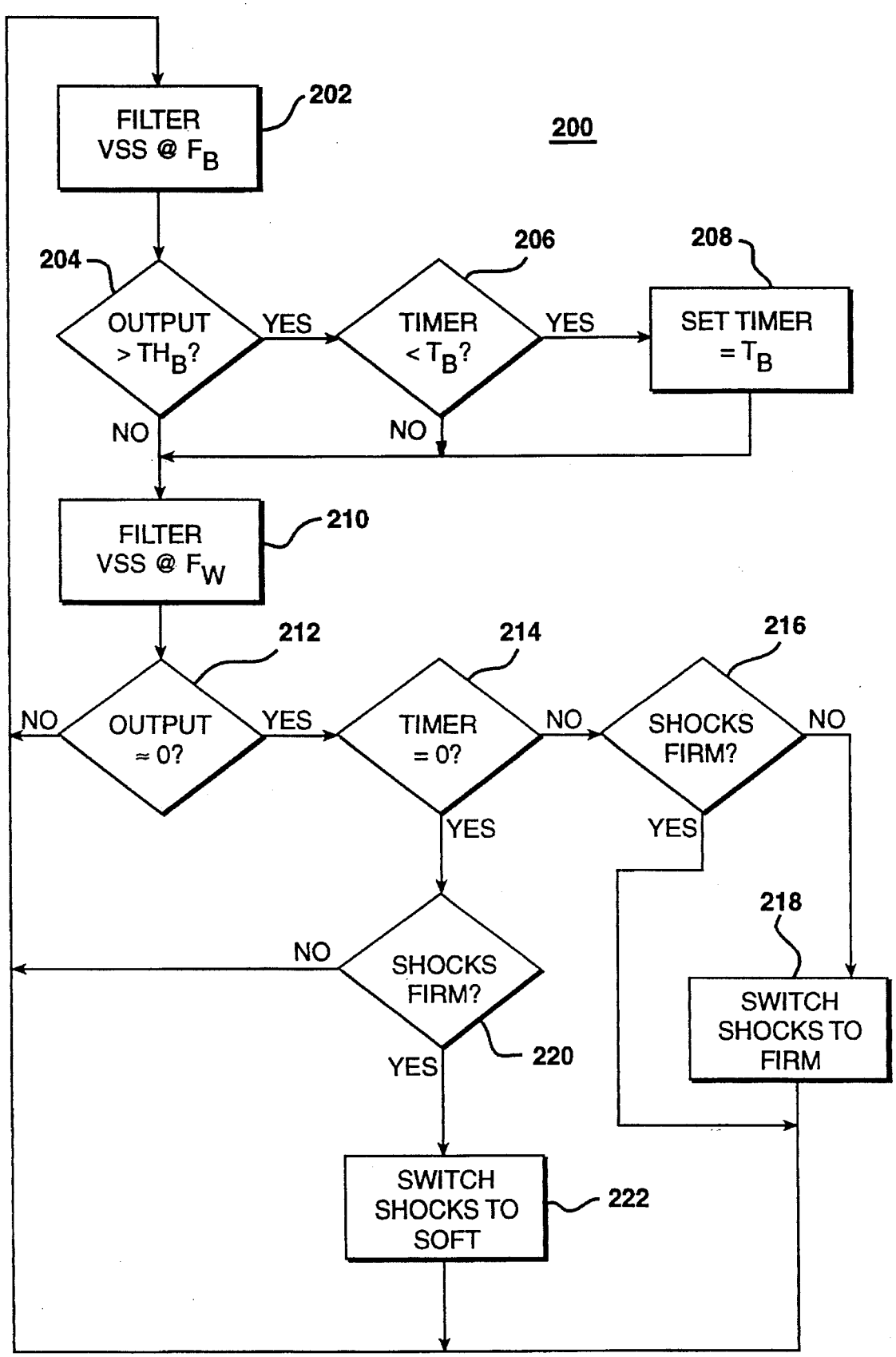
FIG. 2 is a flow chart showing illustrative steps for performing the invention of the present application.

Switching of the damping rate of the two stage shock absorbers 108 will now be described with reference to FIG. 2 which is a flow chart 200 showing illustrative steps for performing the invention of the present application. While it is possible to combine the vehicle suspension signals to arrive at an overall suspension signal which would be used to control the damping state of all of the shock absorbers 108, it is currently preferred to control each axle of shock absorbers separately. Accordingly, the operations depicted in the flow chart of FIG. 2 are preformed independently for both the front shock absorbers 108 and also for the rear shock absorbers 108. Of course, the shock absorbers 108 could be controlled individually, as pairs on the left and right sides of a vehicle, or any other combination which might be advantageous for a given application.

The vehicle height signals from the front height sensor 120 and the rear height sensor 122 are passed to the computer controller 106 for control of the height of the vehicle 100. In addition, the vehicle height signals are used by the computer controller 106 as vehicle suspension signals (VSS's). As earlier noted, the vehicle suspension signals from the front height sensor 120 are processed the same as the vehicle suspension signals from the rear height sensor 122. Thus, for simplicity and ease of description, processing of only one vehicle suspension signal (VSS) will be described with the understanding that the other vehicle suspension signal (VSS) is processed the same to control the other axle of shock absorbers.

The vehicle suspension signal (VSS), for example from the front height sensor 120, is initially filtered by a bandpass filter centered on a body frequency $F_B$ of the vehicle 100, see block 202. For a Ford Explorer, a body frequency $F_B$ of approximately 1 to 4 hertz has been utilized in a working embodiment of the present invention. While discrete analog circuitry could be used to implement the present invention, a digital implementation is preferred because of the versatility and ability to rapidly change parameters for a variety of vehicles, for a variety of conditions and as testing indicates that changes can improve performance.

Figure 3:
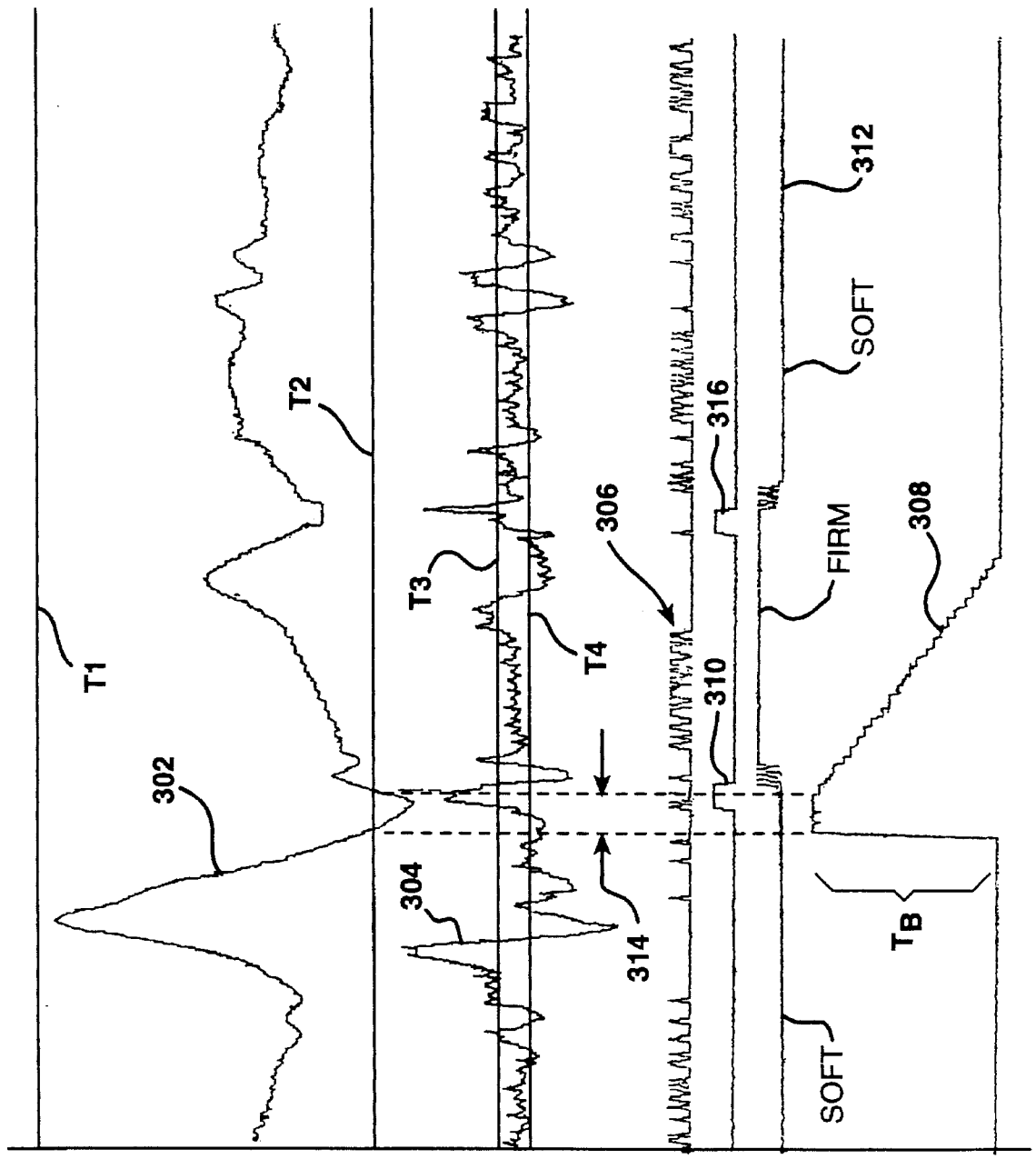
FIG. 3 is a graph of signals generated by performing the steps of FIG. 2.

The body frequency $F_B$ filtered output 302 or body frequency signal is compared to a threshold $T_1$ for suspension jounce and a threshold $T_2$ for suspension rebound, see block 204 and FIG. 3. While the thresholds $T_1$ and $T_2$ can be the same, as illustrated, the jounce threshold $T_1$ is somewhat larger than the rebound threshold $T_2$. In any event, if either of the thresholds $T_1$ and $T_2$ is exceeded, a timer which can be controllably down-counted is checked to determine whether the timer is currently less than $T_B$, the minimum time for the corresponding shocks to be in the firm damping state, see block 206. If the timer has been down counting and hence is less than $T_B$, it is set to $T_B$, see FIG. 3 and block 208. The time $T_B$ for a working embodiment of the present invention applied to a Ford Explorer is 1.4 seconds.

As will become apparent, in the illustrated embodiment of the invention, the timer determines what the damping state of its corresponding shock absorbers will be. Since other suspension conditions can generate signals requesting the shock absorbers 108, all of the shock absorbers 108 or an axle of the shock absorbers 108, to be set to the firm damping state for given periods of time which can be different from one another, the timer can be set to other times by the computer controller 106. This arrangement allows the longest requested firm setting state to dominate.

The vehicle suspension signal (VSS) is next filtered by a bandpass filter centered on the wheel frequency $F_W$ of the vehicle 100, see block 210. For a Ford Explorer, a wheel frequency $F_W$ of approximately 30 hertz has been utilized in a working embodiment of the present invention. The wheel frequency $F_W$ filtered output 304 or wheel frequency signal is compared to a threshold $T_3$ for suspension jounce and a threshold $T_4$ for suspension rebound to determine whether the wheel frequency $F_W$ filtered output 304 is approximately equal to zero, see block 212 and FIG. 3. Here the thresholds $T_3$ and $T_4$ are substantially equal to one another and hence symmetric about a zero signal level; however, the thresholds $T_3$ and $T_4$ need not be equal for the invention. The wheel frequency $F_W$ filtered output 304 is considered to be approximately zero if it is between the thresholds $T_3$ and $T_4$ during a sampling time of approximately every 20 milliseconds.

If the wheel frequency $F_W$ filtered output 304 is approximately zero, i.e. if it is between the thresholds $T_3$ and $T_4$, a corresponding series of switch enable signal pulses 306 are generated, see FIG. 3. For each time that the wheel frequency $F_W$ filtered output 304 is approximately zero, the timer is checked to determine whether it is equal to zero, see block 214. A graph of the down-counting timer is shown in FIG. 3 as 308. If the timer is not equal to zero and the corresponding shock absorbers 108 are not in the firm damping state, a command 310 or first switch request signal to change the damping state of the corresponding shock absorbers is generated. The corresponding shock absorbers are then set to the firm damping state as shown by the graph 312 of FIG. 3, see blocks 216, 218.

As can be seen in FIG. 3, the timer is not down counted during the time 314 that the body frequency $F_B$ filtered output 302 exceeds the threshold $T_1$ or the threshold $T_2$. If the thresholds $T_1$ and $T_2$ are not exceeded, the timer is counted down to zero as shown by the downwardly stepped portion of the timer graph 308 of FIG. 3. If the timer is equal to zero as determined in the block 214, and the corresponding shock absorbers 108 are in the firm damping state, a command 316 or second switch request signal to change the damping state of the corresponding shock absorbers is generated. The corresponding shock absorbers are then set to the soft damping state as shown by the graph 312 of FIG. 3, see blocks 220, 222.

Having thus described the invention of the present application in detail and by reference to preferred embodiments thereof, it will be apparent that modifications and variations are possible without departing from the scope of the invention defined in the appended claims.

What is claimed is:

1. A method for operating a controllable vehicle suspension connected between a body and wheels of a vehicle, said method comprising the steps of:

using a vehicle height signal as a vehicle suspension signal representative of the relative positioning of said body and at least one of said wheels;

passing said vehicle suspension signal through a bandpass filter centered on a body frequency of said vehicle to generate a body frequency signal representative of the velocity of the vehicle suspension at a body frequency;

comparing said body frequency signal to a first threshold for suspension jounce and a second threshold for suspension rebound;

generating a first switch request signal to request more firm damping in said vehicle suspension if said body frequency signal exceeds either of said first and second thresholds;

passing said vehicle suspension signal through a bandpass filter centered on a wheel frequency of said vehicle to generate a wheel frequency signal representative of the velocity of the vehicle suspension at a wheel frequency;

comparing said wheel frequency signal to a third threshold for suspension jounce and a fourth threshold for suspension rebound to determine whether the wheel frequency signal is between said third and fourth thresholds and therefor velocity of said controlled vehicle suspension is approximately equal to zero;

generating a switch enable signal while the velocity of said controlled vehicle suspension is approximately equal to zero to enable switching damping of said vehicle suspension;

combining said first switch request signal and said switch enable signal to generate a switch signal for switching to more firm damping in said vehicle suspension;

maintaining said more firm damping for said vehicle suspension for at least a defined time period;

generating a second switch request signal to request a change in said vehicle suspension to less firm damping upon expiration of said at least a defined time period; and combining said second switch request signal and said switch enable signal to generate a switch signal for switching to less firm damping in said vehicle suspension.

2. A method for operating a controllable vehicle suspension connected between a body and wheels of a vehicle as claimed in claim 1 wherein said first threshold is larger than said second threshold.

3. A method for operating a controllable vehicle suspension connected between a body and wheels of a vehicle as claimed in claim 2 wherein said vehicle height signal is an existing signal generated by said controllable vehicle suspension for determining and adjusting the height of said vehicle such that an additional sensor is not required.

4. A method for operating a controllable vehicle suspension connected between a body and wheels of a vehicle, said vehicle suspension including a front vehicle suspension and a rear vehicle suspension, said method comprising the steps of:

using a front vehicle height signal as a front vehicle suspension signal representative of the relative positioning of said body and at least one of said front wheels;

passing said front vehicle suspension signal through a bandpass filter centered on a body frequency of said vehicle to generate a front body frequency signal representative of the velocity of the front vehicle suspension at a body frequency;

comparing said front body frequency signal to a first threshold for suspension jounce and a second threshold for suspension rebound;

generating a front first switch request signal to request more firm damping of said front vehicle suspension if said front body frequency signal exceeds either of said first and second thresholds;

passing said front vehicle suspension signal through a bandpass filter centered on a wheel frequency of said vehicle to generate a front wheel frequency signal representative of the velocity of the front vehicle suspension at a wheel frequency;

comparing said front wheel frequency signal to a third threshold for suspension jounce and a fourth threshold for suspension rebound to determine whether the front wheel frequency signal is between said third and fourth thresholds and therefor velocity of said front vehicle suspension is approximately equal to zero;

generating a front switch enable signal while the velocity of said front vehicle suspension is approximately equal to zero to enable switching damping of said front vehicle suspension;

combining said first front switch request signal and said front switch enable signal to generate a front switch signal for switching to more firm damping in said front vehicle suspension;

maintaining said more firm damping for said front vehicle suspension for at least a defined time period;

generating a second front switch request signal to request a change in said front vehicle suspension to less firm damping upon expiration of said at least a defined time period; and combining said second front switch request signal and said front switch enable signal to generate a front switch signal for switching to less firm damping in said vehicle suspension.

5. A method for operating a controllable vehicle suspension connected between a body and wheels of a vehicle as claimed in claim 4 further comprising the steps of:

using a rear vehicle height signal as a rear vehicle suspension signal representative of the relative positioning of said body and at least one of said rear wheels;

passing said rear vehicle suspension signal through a bandpass filter centered on a body frequency of said vehicle to generate a rear body frequency signal representative of the velocity of the rear vehicle suspension at a body frequency;

comparing said rear body frequency signal to a first threshold for suspension jounce and a second threshold for suspension rebound;

generating a rear first switch request signal to request more firm damping of said rear vehicle suspension if said rear body frequency signal exceeds either of said first and second thresholds;

passing said rear vehicle suspension signal through a bandpass filter centered on a wheel frequency of said vehicle to generate a rear wheel frequency signal representative of the velocity of the rear vehicle suspension at a wheel frequency;

comparing said rear wheel frequency signal to a third threshold for suspension jounce and a fourth threshold for suspension rebound to determine whether the rear wheel frequency signal is between said third and fourth thresholds and therefor velocity of said rear vehicle suspension is approximately equal to zero;

generating a rear switch enable signal while the velocity of said rear vehicle suspension is approximately equal to zero to enable switching damping of said rear vehicle suspension;

combining said first rear switch request signal and said rear switch enable signal to generate a rear switch signal for switching to more firm damping in said rear vehicle suspension;

maintaining said more firm damping for said rear vehicle suspension for at least a defined time period;

generating a second rear switch request signal to request a change in said rear vehicle suspension to less firm damping upon expiration of said at least a defined time period; and combining said second rear switch request signal and said rear switch enable signal to generate a rear switch signal for switching to less firm damping in said vehicle suspension.

6. A method for operating a controllable vehicle suspension connected between a body and wheels of a vehicle as claimed in claim 5 wherein said first threshold is larger than said second threshold.

7. A method for operating a controllable vehicle suspension connected between a body and wheels of a vehicle as claimed in claim 6 wherein said front vehicle height signal is an existing signal generated by said controllable vehicle suspension for determining and adjusting the height of the front of said vehicle, and said rear vehicle height signal is an existing signal generated by said controllable vehicle suspension for determining and adjusting the height of the rear of said vehicle such that additional sensors are not required.

* * * * *